United States Patent Office 3,299,100
Patented Jan. 17, 1967

3,299,100
MANUFACTURE OF BUTYROLACTONES
Lee V. Phillips, Overland Park, Kans., assignor, by mesne assignments, to Gulf Oil Corporation, Pittsburgh, Pa., a corporation of Pennsylvania
No Drawing. Filed Nov. 20, 1963, Ser. No. 325,143
2 Claims. (Cl. 260—343.6)

This invention is concerned with the manufacture of lactones. More particularly, this invention is a method of manufacturing α-substituted γ-butyrolactones which possess utility by virtue of the fact that they are easily converted to lactams, substituted cyclopropylcarboxylates and other products. Certain α-substituted γ-butyrolactones have been prepared in the past principally for the purpose of studying their interesting odors. Although these substances are of interest as perfuming agents, they are interesting for other purposes. For example, these substances may be converted to α-substituted butyrolactams or 3-substituted 2-pyrrolidones which may be polymerized to yield nylon 4-type linear polymers. The α-substituted γ-butyrolactones may also be converted to 1-substituted cyclopropanecarboxylates which are useful in the manufacture of certain herbicidal agents. A method of synthesis used in the past has utilized as its first step the reaction of ethylene oxide with a substituted malonic ester. However, it has been found much easier to purify the final products when malonic ester itself was reacted with ethylene oxide and the substituent group was placed on the molecule afterward. It has now been discovered that the difficulties resulting from the first synthesis step may be substantially alleviated by reducing the quantity of sodium alkoxide used as the condensing agent in this step. Furthermore, an extraordinarily simple and efficient method has been discovered for converting the malonic ester-ethylene oxide reaction product into the substituted butyrolactone. Briefly, the process of this invention may be represented by the following sequence of reactions:

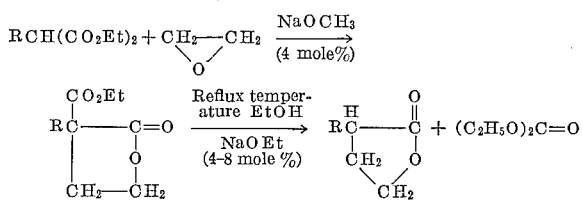

The improvement which has been effected in the synthesis of α-substituted γ-butyrolactones resides primarily in the use of sodium alkoxide in both the reaction of the substituted malonic ester with ethylene oxide and in the subsequent reaction in only quantities large enough to be considered catalytic. The second or de-carbethoxylation step performed by refluxing in the presence of ethanol and a catalytic quantity of sodium ethoxide finds no correspondingly similar procedure in the prior art with which it can be compared, de-carbethoxylation being usually accomplished under acid conditions.

So that the method of this invention may be better understood, the following examples are presented by way of illustration and not of limitation.

EXAMPLE 1

*Preparation of α-carbethoxy-α-methyl-γ-butyrolactone*

A solution of 1.7 g. (0.0316 mole) of sodium methoxide in 5 ml. of absolute ethanol was added to 137.3 g. of commercial diethyl methylmalonate which gas chromatographic analyses indicated to contain about 33% diethyl dimethylmalonate. While the solution was stirred and maintained at 30–35°, 38.3 g. (0.87 mole) of ethylene oxide in 65 ml. of absolute ethanol was added during the course of 3.5 hrs. The reaction continued to be exothermic for about 2.5 hrs. and occasional cooling was required to maintain the temperature below 35°. After the reaction mixture had stood overnight at room temperature, it was acidified with sulfuric acid and distilled to give 39.4 g. of diethyl dimethyl malonate, B.P. 63–73 (4 mm.); $n_{D}^{18}1.4130$, and 89.1 g. of ethyl α-carbethoxy-α-methyl-γ-butyrolactone, B.P. 110–115° (4 mm.); $n_{D}^{18}1.4433$. Based upon the amount of received diethyl dimethylmalonate, this represents a 92% yield of carbethoxylactone.

EXAMPLE 2—PART A

*Preparation of α-methyl-γ-butyrolactone*

A solution of 500 g. (2.86 moles) of diethyl methylmalonate, 6.2 g. (0.114 mole) of sodium methoxide and 40 ml. of absolute ethanol was maintained at 35° while a solution of 140 g. (3.18 moles) of ethylene oxide and 140 ml. of absolute ethanol was added over a 1¼ hr. period. The reaction became exothermic after approximately one-half of the ethylene oxide solution had been added and a cold finger condenser was employed to keep the temperature below 38°. After stirring for 7 hrs., the reaction ceased to be exothermic and it was allowed to stand overnight at room temperature. An additional 6.2 g. of sodium methoxide and 330 ml. of absolute ethanol were added then the solution was refluxed for 17 hrs. After the addition of 5.7 ml. (0.09 mole) of sulfuric acid, the solution was distilled to give 232 g. of diethyl carbonate, 239.8 g. of α-methyl-γ-butyrolactone, B.P. 66–69° (1 mm.); $n_{D}^{13}1.4330$, and 60.9 g. of α-carbethoxy-α-methyl-γ-butyrolactone, B.P. 83–91° (1 mm.); $n_{D}^{13}1.4398$. Diethyl ethylmalonate and diethyl isobutylmalonate were also reacted with ethylene oxide then decarbethoxylated under similar conditions to give an 80% yield of α-ethyl-γ-butyrolactone and a 92% yield of α-isobutyl-γ-butyrolactone. The conversion of α-methyl-γ-butyrolactone to other useful products is demonstrated in parts B and C below.

EXAMPLE 2—PART B

*Preparation of methyl α-methyl-γ-chlorobutyrate*

A mixture of 268 g. (2.65 moles) of α-methyl-γ-chlorobutyrolactone, 5 g. of freshly fused zinc chloride and 250 ml. of methylene chloride was placed in a glass lined autoclave. The autoclave was pressured to 200 p.s.i. with anhydrous hydrogen chloride then stirred and heated at 100–110° for 5 hrs. After removal of methylene chloride under reduced pressure, the residue was refluxed overnight with 1,070 ml. of methanol and 3.5 g. of p-toluenesulfonic acid. The product was distilled to give 264.1 g., B.P. 74–76° (22 mm.), of mixture which contained 90% methyl α-methyl-γ-chlorobutyrate and 10% α-methyl butyrolactone. A higher boiling fraction, 36.7 g., B.P. 77–85° (22 mm.), consisted largely of α-methylbutyrolactone with a small amount of methyl α-methyl-γ-chlorobutyrate.

EXAMPLE 2—PART C

*Preparation of methyl α-methylcyclopropanecarboxylate*

A slurry of 133 g. (2.46 moles) of sodium methoxide, 800 ml. of benzene and 369.9 g. of a mixture which contained 90% methyl α-methyl-γ-chlorobutyrate and 10% α-methyl-γ-butyrolactone was refluxed for 2 hrs. then 450 ml. of the methanol-benzene azeotrope was removed over an 8 hr. period. After the mixture had cooled, 21 ml. of concentrated hydrochloric acid in 350 ml. of water was added. The organic phase was dried and distilled through an efficient column to give 247.7 g. of methyl α-methylcyclopropanecarboxylate, B.P. 121–123°; $n12_D1.4254$. There remained 36 g. of α-methyl-γ-butyrolactone as a distillation residue.

EXAMPLE 3

*Preparation of α-phenoxy-γ-butyrolactone*

A mixture of 40 g. (0.159 mole) of diethyl phenoxymalonate, 1 g. (0.018 mole) of sodium methoxide and 10 ml. of absolute ethanol was heated to 40° then 18.4 g. (0.42 mole) of ethylene oxide in 20 ml. of absolute ethanol was added. The reaction mixture maintained its temperature at 36–39° for 3 hrs. After standing at room temperature overnight, the solution was refluxed for 1 hr. then distilled to give 22 g. of α-phenoxy-γ-butyrolactone, B.P. 140–143° (1 mm.). The product solidified upon standing.

It will be readily apparent to those skilled in the art that a great variety of α-substituted-γ-butyrolactones may be manufactured by the method of this invention. Other variations and applications will occur to those skilled in the art, such variations being within the scope and spirit of the invention disclosed.

What we claim is:

1. A method of manufacturing α-substituted-γ-butyrolactones comprising the following steps:
    (a) Reacting an ester of a substituted malonic acid with ethylene oxide in the presence of less than an equimolar quantity of sodium alkoxide to produce an α-carbalkoxy-α-substituted-γ-butyrolactone.
    (b) Reacting the substituted lactone produced in step (a) in a solution of an effective, but less than equimolar quantity of sodium alkoxide in ethanol to yield an α-substituted-γ-butyrolactone.

2. A method of decarbethoxylation of an α-substituted-α-carbethoxy-γ-butyrolactone comprising the step of refluxing aforesaid substance in a solution containing an effective quantity of sodium alkoxide in ethanol, the concentration of said sodium alkoxide being less than about 10 mole percent.

References Cited by the Examiner

Nikishin et al.: Dok 1. Akad. Nauk SSSR, vol. 138 (1961), pp. 393–6.

Traube et al.: Berichte, vol. 34 (1901), pp. 1971–1980.

Shapira et al.: J. Org. Chem., vol. 16 (1951), pp. 1856–8.

Prelog et al.: Helv. Chim. Acta, vol. 28 (1945), pp. 576–578.

Rothstein: Bull. Soc. Chim., France (1935), part 1, pp. 80–85, 88–90.

WALTER A. MODANCE, *Primary Examiner.*

N. S. RIZZO, *Examiner.*

J. S. PATTEN, *Assistant Examiner.*